US008407182B1

(12) United States Patent
Rajaa et al.

(10) Patent No.: US 8,407,182 B1
(45) Date of Patent: Mar. 26, 2013

(54) SYSTEMS AND METHODS FOR FACILITATING LONG-DISTANCE LIVE MIGRATIONS OF VIRTUAL MACHINES

(75) Inventors: Subash Rajaa, Pune (IN); Sanjay Kumar, Pune (IN); Ashish L Gawali, Pune (IN)

(73) Assignee: Symantec Corporation, Mountain View, CA (US)

( * ) Notice: Subject to any disclaimer, the term of this patent is extended or adjusted under 35 U.S.C. 154(b) by 59 days.

(21) Appl. No.: 13/011,841

(22) Filed: Jan. 21, 2011

(51) Int. Cl.
*G06F 17/30* (2006.01)
*G06F 17/00* (2006.01)
(52) U.S. Cl. ........ 707/610; 707/613; 707/620; 707/625; 711/161; 711/162
(58) Field of Classification Search .................. 707/610, 707/613, 620, 625; 711/161–162
See application file for complete search history.

(56) References Cited

U.S. PATENT DOCUMENTS

| 7,032,089 | B1 * | 4/2006 | Ranade et al. ................. 711/161 |
| 7,900,005 | B2 * | 3/2011 | Kotsovinos et al. .......... 711/162 |
| 2009/0113109 | A1 | 4/2009 | Nelson et al. | |

FOREIGN PATENT DOCUMENTS

WO    2004/014952 A2    2/2004

OTHER PUBLICATIONS

Pariseau, Beth; "VPlex Active-Active Storage Creates a Stir at EMC World"; SearchStorage.com; May 11, 2010.
Shailesh Vaman Marathe, et al; Systems and Methods for Migrating Virtual Machines; U.S. Appl. No. 13/097,635, filed Apr. 29, 2011.

* cited by examiner

*Primary Examiner* — Yicun Wu
(74) *Attorney, Agent, or Firm* — ALG Intellectual Property, LLC

(57) ABSTRACT

A computer-implemented method for facilitating long-distance live migrations of virtual machines may include: 1) identifying a request for a live migration of a virtual machine from a primary site to a secondary site, the primary site including a primary storage device used for storage by the virtual machine being configured for active-passive replication to a secondary storage device at the secondary site, 2) initiating a failover of the active-passive replication from the primary storage device to the secondary storage device in response to the request, 3) intercepting each write attempt made by the virtual machine at the secondary site to the secondary storage device before completion of the failover, 4) buffering each intercepted write attempt, 5) determining that the failover is complete, and 6) applying each buffered write attempt to the secondary storage after determining that the failover is complete. Various other methods, systems, and computer-readable media are also disclosed.

20 Claims, 8 Drawing Sheets

SYSTEMS AND METHODS FOR FACILITATING LONG-DISTANCE LIVE MIGRATIONS OF VIRTUAL MACHINES

BACKGROUND

System administrators may migrate virtual machines from one location to another in order to upgrade hardware, perform system maintenance, manage system resources, or improve virtual machine performance. In some cases, a system administrator may avoid any downtime for a virtual machine by performing a live migration (e.g., keeping the original instance of the virtual machine running until a duplicate instance is ready to take over at an alternate location). For example, the state of the virtual processor and the virtual memory of the virtual machine may be copied to a target hypervisor. Once the target hypervisor is loaded with the virtual machine, the virtual machine may continue to run as before.

However, in order to fully preserve the statefulness of the migrated virtual machine, the virtual machine may also require the same storage view. Ordinarily this may be achieved simply by directing the migrated virtual machine to the same storage device that it sued before. Unfortunately, if the target location for a live migration of a virtual machine is a long distance from the original location of the virtual machine (e.g., in a different data center), the original storage device may be too far from the target location of the virtual machine, introducing unacceptable latency. Furthermore, a system administrator may wish to take the original storage device offline as well (e.g., due to an expected outage at the original data center). Accordingly, the instant disclosure addresses a need for systems and methods for facilitating long-distance live migrations of virtual machines.

SUMMARY

As will be described in greater detail below, the instant disclosure generally relates to systems and methods for facilitating long-distance live migrations of virtual machines. Systems and methods described herein may facilitate a long-distance live migration of a virtual machine by temporarily buffering write attempts made by a migrated virtual machine until a storage replication failover for a storage device containing the data for the migrated virtual machine has completed. The systems and methods described herein may also, in some examples, redirect read attempts from the migrated virtual machine until the failover has completed.

For example, a method may include identifying a request for a live migration of a virtual machine from a primary site to a secondary site, where the primary site may include a primary storage device used for storage by the virtual machine and the primary storage device may be configured for active passive replication to a secondary storage device at the secondary site. As will be explained in greater detail below, while active-passive replication is ongoing, the primary storage device may be writable while the secondary device may be in a read-only state. The method may also include initiating a failover of the active-passive replication from the primary storage device to the secondary storage device in response to the request, intercepting each write attempt made by the virtual machine at the secondary site to the secondary storage device before completion of the failover, buffering each intercepted write attempt, determining that the failover is complete, and then applying each buffered write attempt to the secondary storage device after determining that the failover is complete.

The live migration may include copying an execution state and a memory state of the virtual machine from the first site to the second site. In some examples (e.g., where read attempts by the virtual machine are intercepted and fulfilled from the primary storage device), the active-passive replication may operate asynchronously. Alternatively, the active-passive replication may operate synchronously. The failover may include bringing the secondary storage device into the same state as the primary storage device through the active-passive replication and then terminating the active-passive replication.

The systems described herein may intercept each write attempt made by the virtual machine in a variety of ways. For example, these systems may interpose a read-write layer between the virtual machine and the secondary storage device. Additionally or alternatively, these systems may create a snapshot of the secondary storage device and expose the virtual machine to the snapshot by mounting the snapshot. In these examples, buffering each intercepted write attempt may entail applying each intercepted write attempt to the snapshot. Furthermore, in these examples applying each buffered write attempt to the secondary storage device may entail resynchronizing the snapshot with the secondary storage device.

In some examples, the systems and methods described herein may also intercept each read attempt made by the virtual machine at the secondary site to the secondary storage device before completion of the failover. In these examples, these systems and methods may also fulfill at least one intercepted read attempt from the primary storage device. Additionally or alternatively, these systems and methods may also intercept at least one intercepted read attempt corresponding to a target location of at least one buffered write attempt and then fulfill the read attempt with the buffered write attempt.

In some contexts (e.g., where the active-passive replication is synchronous), the systems and methods described herein may fulfill one or more read attempts performed by the virtual machine from the secondary storage device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
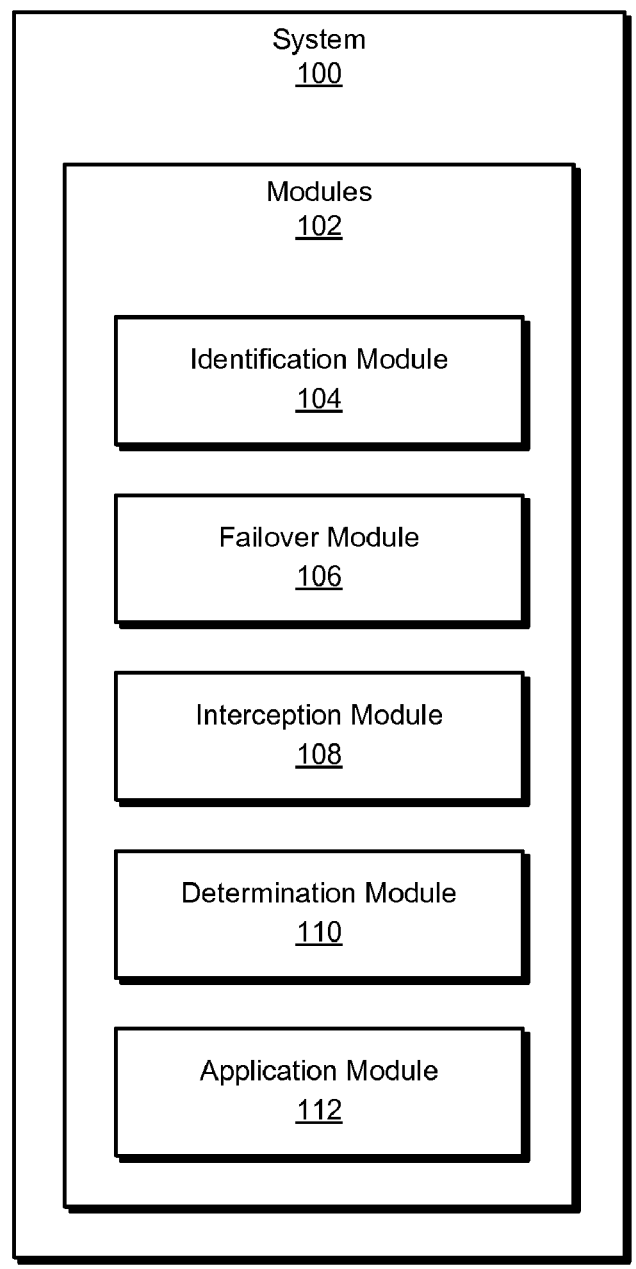
FIG. 1 is a block diagram of an exemplary system for facilitating long-distance live migrations of virtual machines.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for facilitating long-distance live migrations of virtual machines. Systems and methods described herein may facilitate a long-distance live migration of a virtual machine by temporarily buffering write attempts made by a migrated virtual machine until a storage replication failover from a primary storage device to a secondary storage device containing the data for the migrated virtual machine has completed. The systems and methods described herein may also, in some examples, redirect read attempts from the migrated virtual machine until the failover has completed.

By temporarily buffering write attempts made by a migrated virtual machine until the failover is complete and fulfilling read attempts from the primary storage device or the buffer in the case of asynchronous replication and from the secondary storage device or the buffer in the case of synchronous replication, these systems and methods may allow the live migration of the virtual machine, as well as a complete migration of the storage used by the virtual machine, using an active-passive replication system. Accordingly, these systems and methods may enable system administrators to perform live migration of virtual machines over long distances (e.g., from one data center to another) without requiring bidirectional synchronous replication (e.g., using an active-active replication system). Furthermore, these systems and methods may enable system administrators to migrate all components of a virtual machine, including storage, out of a data center that may be unusable in the near future (e.g., due to a scheduled outage of the data center, an anticipated disaster at the data center, etc.) without causing downtime for the virtual machine.

The following will provide, with reference to FIGS. 1-2 and 4-6, detailed descriptions of exemplary systems for facilitating long-distance live migrations of virtual machines. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for facilitating long-distance live migrations of virtual machines. As illustrated in this figure, exemplary system 100 may include one or more modules 102 for performing one or more tasks. For example, and as will be explained in greater detail below, exemplary system 100 may include an identification module 104 programmed to identify a request for a live migration of a virtual machine from a primary site to a secondary site, where the primary site may include a primary storage device used for storage by the virtual machine and the primary storage device may be configured for active passive replication to a secondary storage device at the secondary site. Exemplary system 100 may also include a failover module 106 programmed to initiate a failover of the active-passive replication from the primary storage device to the secondary storage device in response to the request.

In addition, and as will be described in greater detail below, exemplary system 100 may include an interception module 108 programmed to intercept each write attempt made by the virtual machine at the secondary site to the secondary storage device before completion of the failover. Interception module 108 may also be programmed to buffer each intercepted write attempt. Exemplary system 100 may also include a determination module 110 programmed to determine that the failover is complete. Exemplary system 100 may additionally include an application module 112 programmed to apply each buffered write attempt to the secondary storage device after determining that the failover is complete. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or computing system 206), the devices illustrated in FIGS. 3-5 (e.g., hypervisor 420, hypervisor 470, primary storage device 440, and/or secondary storage device 490), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Figure 2:
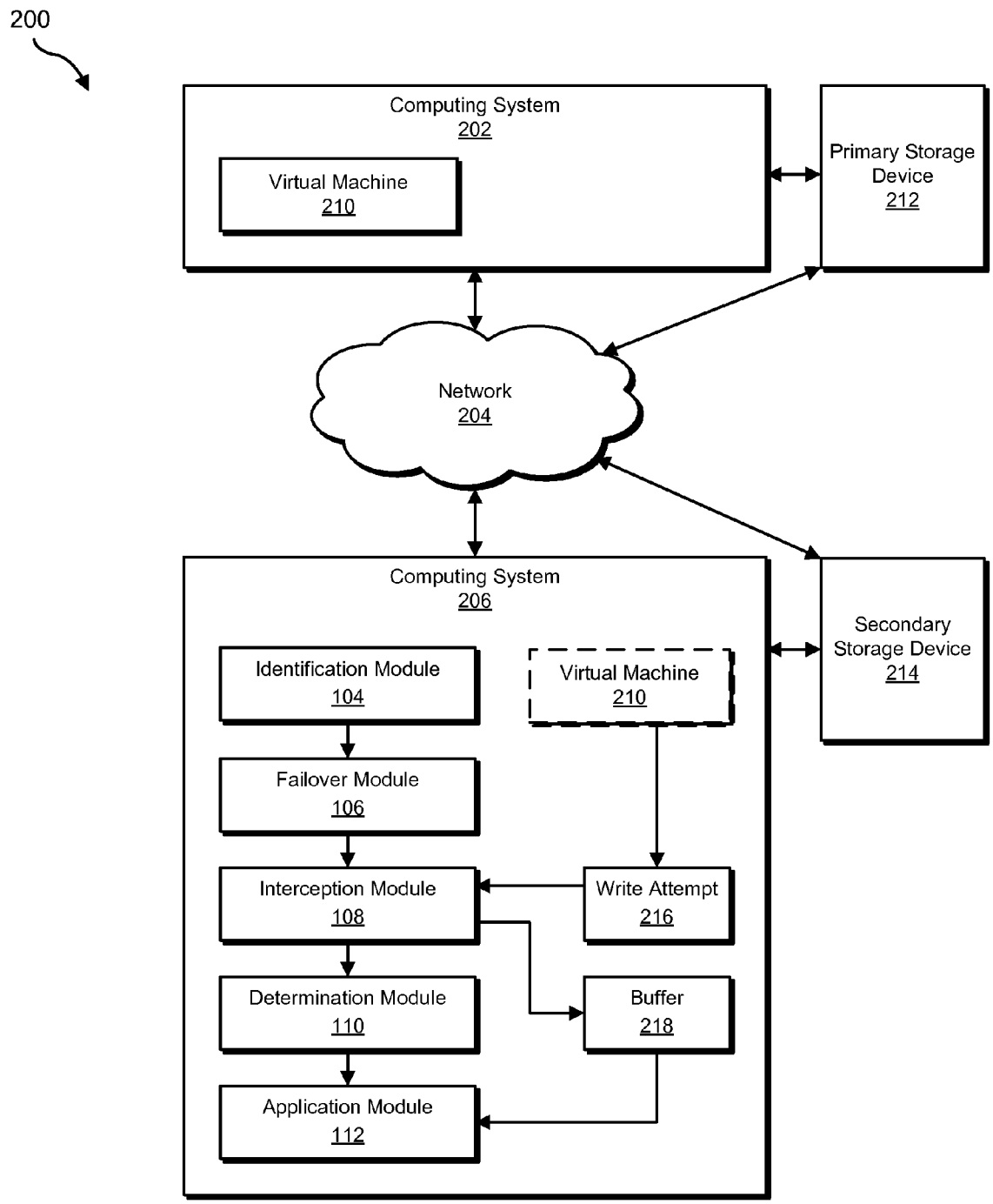
FIG. 2 is a block diagram of another exemplary system for facilitating long-distance live migrations of virtual machines.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 hosting a virtual machine 210 in the process of a live migration to a computing system 206 over a network 204. In one embodiment, and as will be described in greater detail below, computing system 206 may include identification module 104, failover module 106, interception module 108, determination module 110, and application module 112.

Identification module 104 may be programmed to identify a request for a live migration of virtual machine 210 from computing system 202 to computing system 206, where primary storage device 212 may be used for storage by virtual machine 210 and primary storage device 212 may be configured for active passive replication to secondary storage device 214. Failover module 106 may be programmed to initiate a failover of the active-passive replication from primary storage device 212 to secondary storage device 214 in response to the request. Interception module 108 may be programmed to intercept a write attempt 216 made by virtual machine 210 on computing system 206 to secondary storage device 214 before completion of the failover. Interception module 108 may also be programmed to buffer intercepted write attempt 216 to a buffer 218. Determination module 110 may be programmed to determine that the failover is complete. Application module 112 may be programmed to apply buffered write attempt 216 from buffer 218 to secondary storage device 214 after determining that the failover is complete.

Computing system 202 generally represents any type or form of computing device capable of reading computer-executable instructions. Examples of computing system 202 include, without limitation, hypervisors, servers, computing clusters, laptops, desktops, cellular phones, personal digital assistants (PDAs), multimedia players, embedded systems, combinations of one or more of the same, exemplary computing system 710 in FIG. 7, or any other suitable computing device.

Computing system 206 generally represents any type or form of computing device capable of reading computer-executable instructions. Examples of computing system 206 include, without limitation, hypervisors, servers, computing clusters, laptops, desktops, cellular phones, personal digital assistants (PDAs), multimedia players, embedded systems, combinations of one or more of the same, exemplary computing system 710 in FIG. 7, or any other suitable computing device.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing system 202 and computing system 206.

Primary storage device 212 may represent portions of a single storage device or a plurality of storage devices. In some examples, primary storage device 212 may also represent portions of a computing system and/or appliance configured for replicating data. Likewise, secondary storage device 214 may represent portions of a single storage device or a plurality of storage devices. In some examples, secondary storage device 214 may also represent portions of a computing system and/or appliance configured for receiving replicated data.

Figure 3:
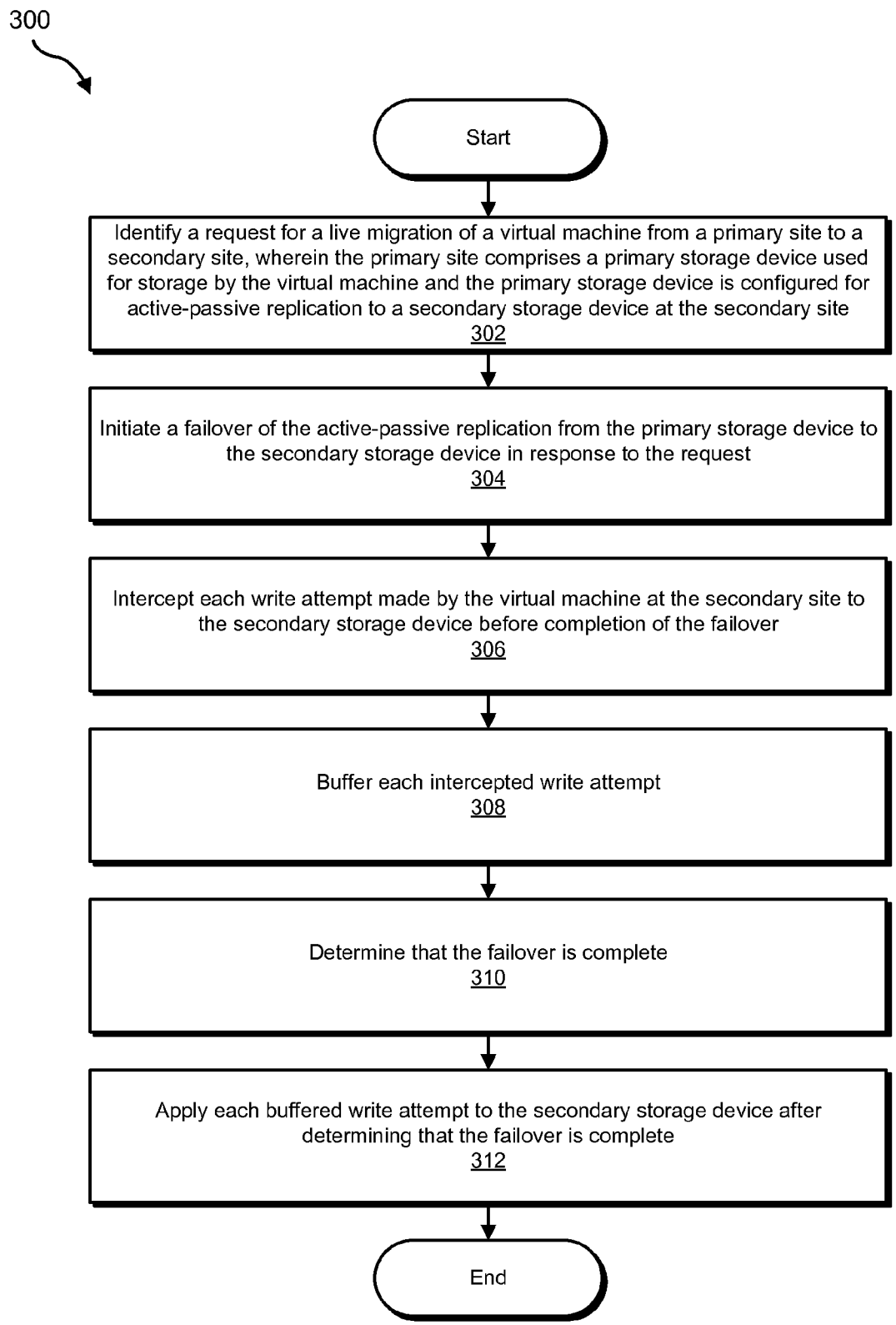
FIG. 3 is a flow diagram of an exemplary method for facilitating long-distance live migrations of virtual machines.

FIG. 3 is a flow diagram of an exemplary computer-implemented method 300 for facilitating long-distance live migrations of virtual machines. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a request for a live migration of a virtual machine from a primary site to a secondary site. The primary site may include a primary storage device used for storage by the virtual machine and the primary storage device may be configured for active-passive replication to a secondary storage device at the secondary site. For example, at step 302 identification module 104 may, as part of computing system 206 in FIG. 2, identify a request for a live migration of virtual machine 210 from computing system 202 to computing system 206, where primary storage device 212 may be used for storage by virtual machine 210 and primary storage device 212 may be configured for active passive replication to secondary storage device 214.

The request may include any command, instruction, and/or configuration data indicating that the live migration is imminent and/or in process. Accordingly, identification module 104 may identify the request in a variety of ways. For example, identification module 104 may identify the request by receiving a message from a hypervisor, a migration appliance, and/or an application. Additionally or alternatively, identification module 104 may identify the request by identifying a result of the request. For example, identification module 104 may identify the request by identifying the transmission of the virtual machine to the secondary site and/or the installation of the virtual machine at the secondary site.

As used herein, the phrase "live migration" may refer to any migration and/or transfer of a virtual machine that minimizes and/or eliminates downtime for the virtual machine. For example, the phrase "live migration" may refer to statefully copying a virtual machine from a primary site to a secondary site and bringing the stateful copy of the virtual machine online (e.g., running and available for transactions) before the original instance of the virtual machine is taken offline. In some examples, the live migration may include copying an execution state (e.g., a virtual processor and the state of the virtual processor) and a memory state (e.g., a virtual random-access memory module and the state of the memory module) from the first site to the second site.

As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

As used herein, the term "site" may refer to a geographical location, a network location, and/or a group of computing devices. The phrase "primary site" may refer to a site at which a virtual machine operates before a migration. Additionally or alternatively, "primary site" may refer to a site that includes source data (e.g., stored on a primary storage device) for an active-passive replication scheme. Likewise, the phrase "secondary site" may refer to a site to which a virtual machine may migrate and/or operate after migration. Additionally or alternatively, "secondary site" may refer to a site that includes a replication target (e.g., a secondary storage device) for an active-passive replication scheme. In some examples, as will be described in greater detail below, the secondary storage device may, if locally mounted at the second site, function as a read-only device during replication.

As used herein, the phrase "active-passive replication" may refer to any method and/or process of replicating data from a primary storage device to a secondary storage device. In some examples, "active-passive replication" may refer to replication wherein the primary storage device is writable and the secondary storage device is read-only while replication is ongoing. In some examples, the primary and secondary storage devices may include replication technology and/or be connected to replication appliances. As will be described below, replication generally may function synchronously (e.g., requiring any change to data on the primary storage device to first be committed to the secondary storage device) or asynchronously (e.g., allowing a change to data on the primary storage device without first ensuring that the change is made to the secondary storage device, potentially resulting in the secondary storage device not reflecting the state of the primary storage device at any given moment). Examples of systems that may provide and/or facilitate active-passive replication include HITATCHI TRUECOPY, SYMMETRIX REMOTE DATA FACILITY, and VERITAS VOLUME REPLICATOR.

As mentioned above, in some examples identification module 104 may identify the request for the live migration by identifying the live migration. In some examples, identification module 104 may identify the live migration by performing the live migration. For example, identification module 104 may copy the virtual machine to the secondary site. Additionally or alternatively, identification module 104 may perform the replication for the data used by the virtual machine from the primary site to the secondary site. In some examples, identification module 104 may replicate cache information for the primary storage device as well as the data used by the virtual machine. For example, identification module 104 may replicate a dirty map (e.g., including written block numbers) to the secondary storage device. Identification module 104 may then invalidate the written block numbers as indicated by the dirty map in the cache on the secondary storage device. As will be explained in greater detail below, when the virtual machine goes online at the secondary site, the virtual machine may require the same view of storage as it had on the primary site. Accordingly, by providing the same or similar cache state on the secondary site as well, the systems and methods described herein may improve the performance of the virtual machine at the secondary site.

In some examples, identification module 104 may identify the live migration as a long-distance live migration. For example, identification module 104 may determine that the distance between the primary site and the secondary site exceeds a predetermined threshold (e.g., 200 kilometers). For example, identification module 104 may use IP addresses and/or other geolocation data to determine the locations of the primary and secondary sites and then calculate and/or estimate the distance. Additionally or alternatively, identification module 104 may determine that the data transfer latency between the primary and secondary sites exceeds a predetermined threshold. In some examples, identification module 104 may determine that the distance (e.g., geographical and/or in terms of latency) between the primary site and the secondary site is so great as to require asynchronous replication instead of synchronous replication between the sites. Additionally or alternatively, identification module 104 may simply determine that the primary site is configured to perform asynchronous replication to the secondary site.

Figure 4:
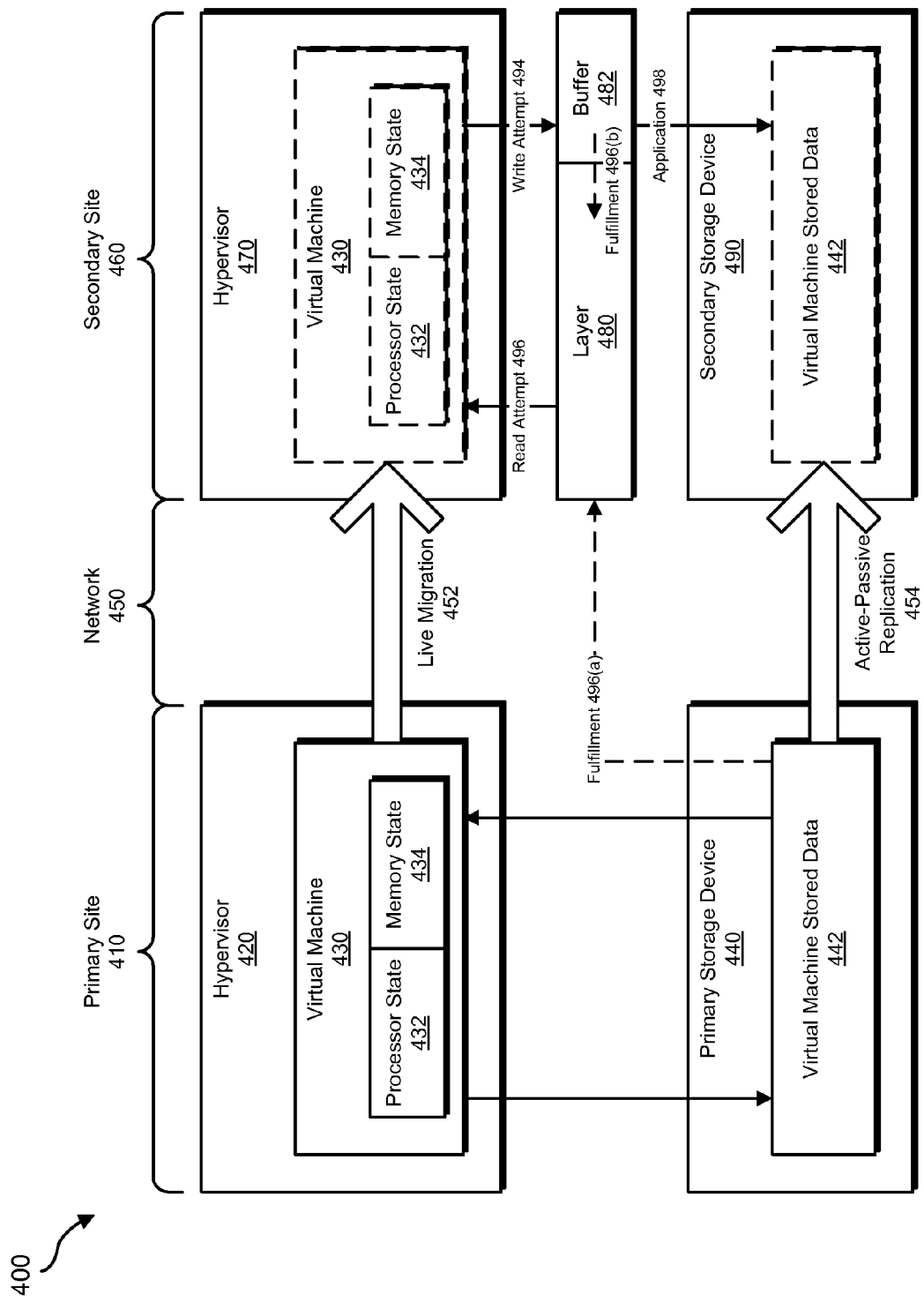
FIG. 4 is a block diagram of an exemplary system for facilitating long-distance live migrations of virtual machines.

FIG. 4 is a block diagram of an exemplary system 400 for facilitating long-distance live migrations of virtual machines. As illustrated in FIG. 4, a primary site 410 may include a hypervisor 420 hosting a virtual machine 430 with a processor state 432 and a memory state 434. Primary site 410 may also include a primary storage device 440 with virtual machine stored data 442. A live migration 452 may migrate virtual machine 430 (with processor state 432 and memory state 434 intact) to a hypervisor 470 at a secondary site 460 via a network 450. Secondary site 460 may also include a secondary storage device 490. Primary storage device 440 and/or an appliance in communication with primary storage device 440 may be configured to replicate virtual machine stored data 442 to secondary storage device 490, represented as an active-passive replication 454. Identification module 104 may accordingly identify live migration 452.

Returning to FIG. 3, at step 304 one or more of the systems described herein may initiate a failover of the active-passive replication from the primary storage device to the secondary storage device in response to the request. For example, at step 304 failover module 106 may, as part of computing system 206 in FIG. 2, initiate a failover of active-passive replication from primary storage device 212 to secondary storage device 214 in response to the request. Using FIG. 4 as an additional example, failover module 106 may initiate a failover of active-passive replication 454 from primary storage device 440 to secondary storage device 490.

As used herein, the term "failover" may generally refer to any procedure and/or process for using a secondary device as a new active (e.g., primary) device in lieu of an old primary device. In some examples, a "failover" may refer to a procedure and/or process for concluding a replication relationship between two devices. For example, the failover may include bringing the secondary storage device into the same state as the primary storage device through the active-passive replication and then terminating the active-passive replication. At the conclusion of the failover, the secondary storage device may be fully available for use by the virtual machine and/or may provide a storage view to the virtual machine consistent with the storage view before the migration of the virtual machine. In some examples, a "failover" may also refer to reversing the direction of replication and reversing the roles of primary and secondary device (e.g., after the secondary device has been brought up-to-date with the primary device by the underlying replication).

Failover module 106 may perform step 304 in any suitable manner. For example, failover module 106 may transmit a command to the primary storage device (and/or a replication appliance connected to the primary storage device) and/or to the secondary storage device.

Failover module 106 may initiate the failover in response to the request in a variety of contexts. For example, failover module 106 may initiate the failover following the identification of the request. Additionally or alternatively, failover module 106 may initiate the failover following the completion of the request (e.g., after the virtual machine has migrated to the secondary site). In some examples, failover module 106 may initiate the failover once an I/O operation is received from the virtual machine at the secondary site.

In some contexts, the systems described herein may perform a live migration of more than one virtual machine at once (e.g., multiple virtual machines at the primary site may use the primary storage device). In these contexts, failover module 106 may wait until all of the virtual machines have migrated to the secondary site before initiating the failover for all of the virtual machines. Waiting for all of the virtual machines may be necessary if the active-passive replication is configured to replicate all data on the primary storage device to the secondary storage device.

At step 306 one or more of the systems described herein may intercept each write attempt made by the virtual machine at the secondary site to the secondary storage device before completion of the failover. For example, at step 306 interception module 108 may, as part of computing system 206 in FIG. 2, intercept write attempt 216 made to secondary storage device 214 before completion of the failover.

Interception module 108 may perform step 306 in a variety of ways. For example, interception module 108 may interpose a read-write layer between the virtual machine and the secondary storage device. As used herein, the phrase "read-write layer" may refer to any virtual device, module, and/or intercepting agent which may stand in for a storage device (e.g., the secondary storage device) from the view of a virtual machine and/or enhance, modify the functionality of, and/or virtualize a storage device. For example, the read-write layer may give the illusion of read-write capability to the virtual machine even though the secondary storage device may be read-only with respect to the virtual machine before the failover is complete.

In some examples, interception module 108 may inject a filter driver on top of the file system used by the virtual machine for the secondary storage device. By injecting the filter driver, the interception module 108 may create and/or enable the creation of the read-write layer discussed above. Interception module 108 may inject the filter driver at any suitable time, such as before the live migration. The filter driver may be configured to intercept I/O operations from the virtual machine once the virtual machine is online at the secondary site. As will be explained below, once the failover is complete, the filter driver may update the virtual machine data on the secondary storage device and unload itself.

Using FIG. 4 for an example, interception module 108 may create a layer 480 between virtual machine 430 and secondary storage device 490 (e.g., by injecting the filter driver described above). Layer 480 may intercept a write attempt 494 made by virtual machine 430 after the live migration 452 to secondary site 460.

Figure 5:
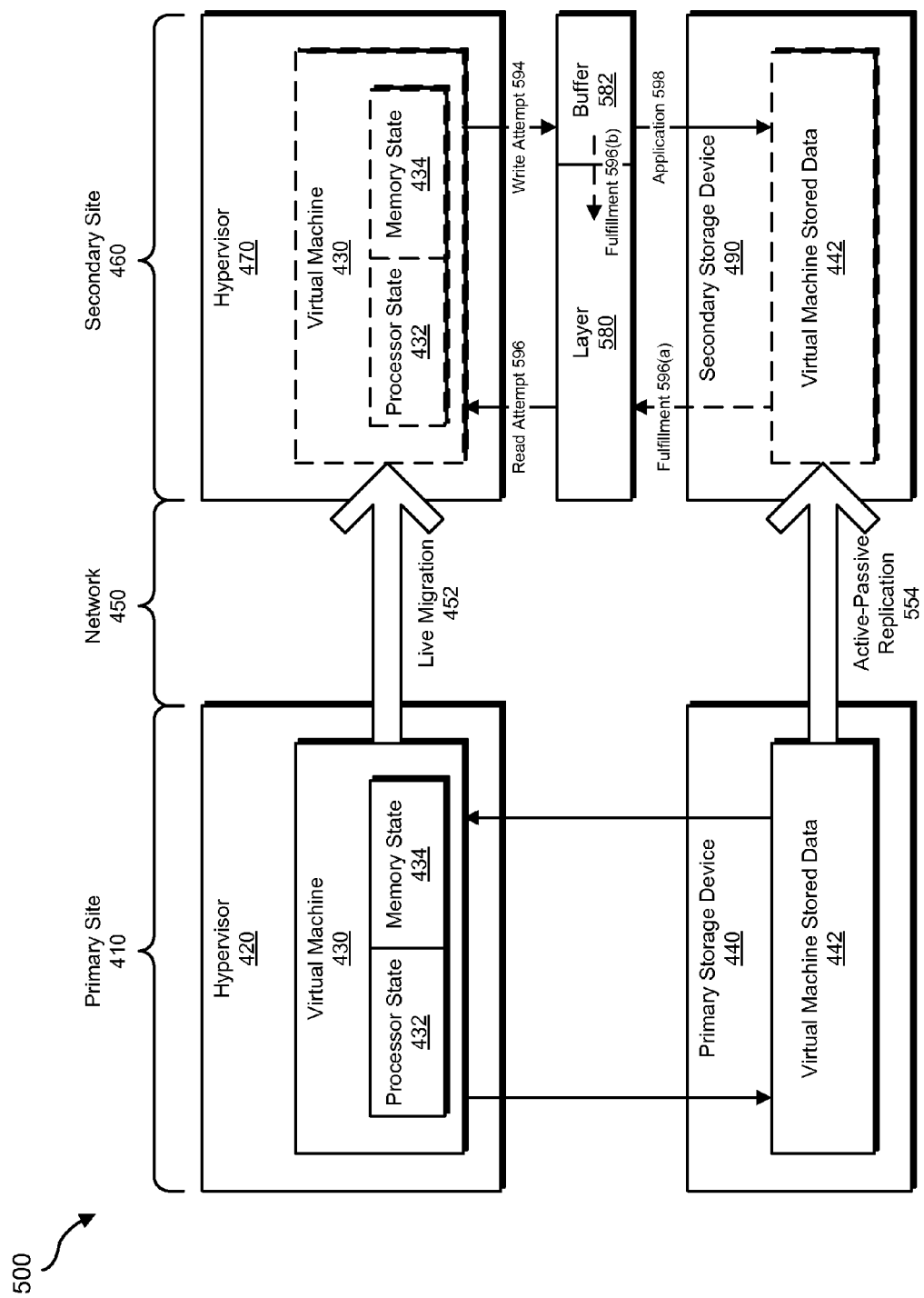
FIG. 5 is a block diagram of another exemplary system for facilitating long-distance live migrations of virtual machines.

Likewise, FIG. 5 illustrates an exemplary system 500 for facilitating long-distance live migrations of virtual machines. As illustrated in FIG. 5, a layer 580 (created, e.g., by interception module 108) may separate virtual machine 430 from secondary storage device 490. Layer 580 may, accordingly, intercept a write attempt 594 made by virtual machine 430. As will be explained in greater detail below, layer 580 may differ from layer 480 in FIG. 4 due in part to differences between active-passive replication 454 in FIG. 4 and an active-passive replication 554 in FIG. 5.

Returning to the discussion of step 306, interception module 108 may intercept each write attempt made by the virtual machine by creating a snapshot of the secondary storage device and then exposing the virtual machine to the snapshot by mounting the snapshot. As used herein, the term "snapshot" may refer to any representation of a volume of data and/or a portion of a volume of data at a certain point in time. For example, interception module 108 may create a space-optimized read/write snapshot (e.g., a snapshot that references a volume of data in its original state and records changes made to the volume of data).

Figure 6:
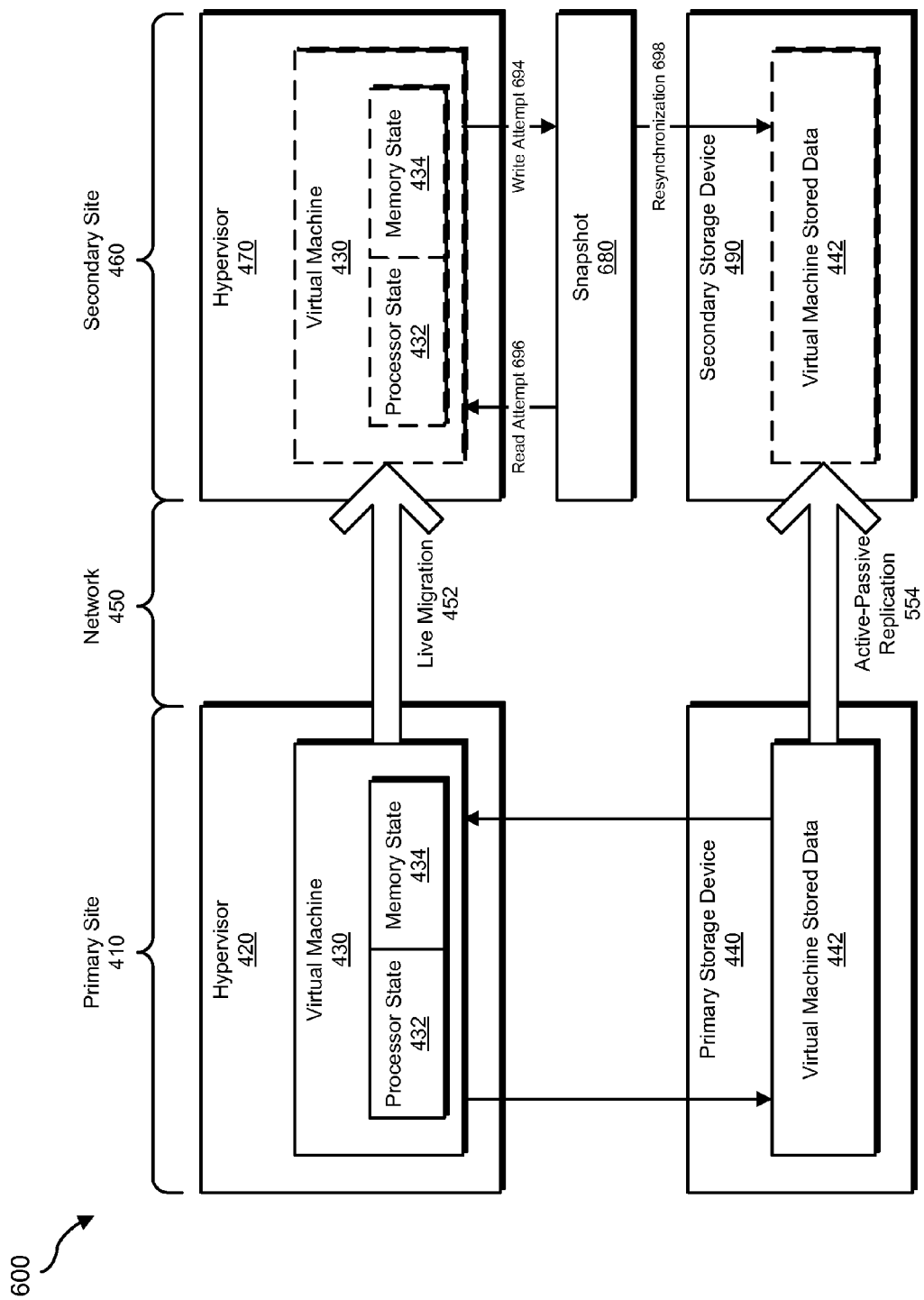
FIG. 6 is a block diagram of another exemplary system for facilitating long-distance live migrations of virtual machines.

FIG. 6 illustrates an exemplary system 600 for facilitating long-distance live migrations of virtual machines. As illustrated in FIG. 6, interception module 108 may create a snapshot 680 of secondary storage device 490 and may mount snapshot 680 for use by virtual machine 430. Snapshot 680 may thereby effectively intercept a write attempt 694 performed by virtual machine 430.

Returning to FIG. 3, at step 308 one or more of the systems described herein may buffer each intercepted write attempt. For example, at step 308 interception module 108 may, as part of computing system 206 in FIG. 2, buffer write attempt 216 in a buffer 218.

Interception module 108 may perform step 308 in any suitable manner. For example, interception module 108 may buffer each intercepted write attempt in a temporary log on a storage device. Additionally or alternatively, interception module 108 may buffer each intercepted write attempt in random access memory. Generally, interception module 108 may buffer each intercepted write attempt by buffering the content of each intercepted write attempt as well as information indicating the intended destination of each intercepted write attempt.

Using FIG. 4 as an example, interception module 108 may (e.g., as part of layer 480 and/or by creating layer 480) buffer write attempt 494 in a buffer 482. Likewise, using FIG. 5 as an example, interception module 108 may buffer write attempt 594 in a buffer 582.

As mentioned earlier, in some examples interception module 108 may intercept each write attempt by creating a snapshot. In these examples, interception module 108 may buffer each intercepted write attempt by applying each intercepted write attempt to the snapshot. In some examples, interception module 108 may accomplish this task simply by mounting the snapshot for use by the virtual machine. Using FIG. 6 as an example, a write attempt 694 that would have been destined for secondary storage device 490 may be intercepted by snapshot 680. Interception module 108 may accordingly apply (or cause to be applied) write attempt 694 to snapshot 680, effectively buffering write attempt 694 from secondary storage device 490.

Returning to FIG. 3, at step 310 one or more of the systems described herein may determine that the failover is complete. For example, at step 310 determination module 110 may, as part of computing system 206 in FIG. 2, determine that the failover is complete. Using FIG. 4 as an example, determination module 110 may determine that primary storage device 440 has failed over to secondary storage device 490 (e.g., concluding active-passive replication 454 and bringing virtual machine stored data 442 to the same state on secondary storage device 490 as on primary storage device 440).

Determination module 110 may perform step 310 in any suitable manner. For example, determination module 110 may receive a message from the primary storage device and/or the secondary storage device indicating that the failover is complete.

At step 312 one or more of the systems described herein may apply each buffered write attempt to the secondary storage device after determining that the failover is complete. For example, at step 312 application module 112 may, as part of computing system 206 in FIG. 2, apply write attempt 216 stored in buffer 218.

Application module 112 may perform step 312 in a variety of ways. For example, as explained above, in some contexts the systems described herein may interpose a read-write layer between the virtual machine and the secondary storage device that intercepts each write attempt and stores each write attempt in a buffer. Accordingly, application module 112 may forward and/or apply each write attempt from the buffer to the secondary storage device. Using FIG. 4 as an example, application module 112 may perform an application 498 of each write attempt in buffer 482 (e.g., write attempt 494) to secondary storage device 490. Likewise, using FIG. 5 as an example, application module 112 may perform an application 598 of each write attempt in buffer 582 (e.g., write attempt 594) to secondary storage device 490.

As explained above, in some other contexts the systems described herein may create and expose a snapshot to the virtual machine. In these contexts, application module 112 may apply each write attempt buffered by the snapshot by resynchronizing the snapshot with the secondary storage device. Using FIG. 6 as an example, application module 112 may perform a resynchronization 698 of snapshot 680 on secondary storage device 490, effectively applying each write attempt buffered by the snapshot (e.g., write attempt 694) to secondary storage device 490. After step 312, method 300 may terminate.

Once the failover is complete and the buffered write attempts have been applied to the secondary storage device, the systems and methods described herein may, in accordance with the various embodiments described herein, remove the read-write layer and/or unmount the snapshot and cause the secondary storage device to serve read and write attempts by the virtual machine directly, thereby completing migration of the storage used by the virtual machine.

In some examples, the systems described herein may also intercept each read attempt made by the virtual machine at the secondary site to the secondary storage device before completion of the failover. These systems may intercept each read attempt in a variety of contexts. For example, as mentioned above, the active-passive replication may operate asynchronously. Due to the properties of asynchronous replication, the secondary storage device may therefore not be guaranteed to reflect the latest state of the primary storage device. Accordingly, in this example, these systems may fulfill one or more read attempt from the primary storage device. However, at least one read attempt made by the virtual machine may correspond to a target location of at least one previously issued and subsequently buffered write attempt. In this case, the primary storage device may not reflect the correct state at the target location. Accordingly, the systems described herein may, in this case, fulfill the read attempt with the buffered write attempt.

Using FIG. 4 as an example, active-passive replication 454 may operate asynchronously. Virtual machine 430 may make a read attempt 496 on secondary storage device 490. In some examples, layer 480 may intercept read attempt 496 and fulfill read attempt 496 from primary storage device 440, represented by a fulfillment 496(*a*). However, if read attempt 496 corresponds to a data location intended to be overwritten by previously issued write attempt 494, layer 480 may instead fulfill read attempt 496 from buffer 482 using write attempt 494, as represented by a fulfillment 496(*b*).

Returning to the general discussion of intercepting each read attempt, as mentioned earlier, in some contexts the active-passive replication may operate synchronously. In these contexts, due to the properties of synchronous replication, the secondary storage device may reliably reflect the state of the primary storage device. Accordingly, the systems described herein may generally fulfill each read attempt from the secondary storage device. For example, these systems may mount the secondary storage device as a read-only device for the virtual machine. However, at least one read attempt made by the virtual machine may correspond to a target location of at least one previously issued and subsequently buffered write attempt. In this case, the primary storage device may not reflect the correct state at the target location. Accordingly, the systems described herein may, in this case, fulfill the read attempt with the buffered write attempt.

Using FIG. 5 as an example, active-passive replication 554 may operate synchronously. Virtual machine 430 may make a read attempt 596 on secondary storage device 490. In some examples, layer 580 may intercept read attempt 596 and fulfill read attempt 596 from secondary storage device 540, represented by a fulfillment 596(*a*). However, if read attempt 596 corresponds to a data location intended to be overwritten by previously issued write attempt 594, layer 580 may instead fulfill read attempt 596 from buffer 582 using write attempt 594, as represented by a fulfillment 596(*b*).

Returning to the general discussion of the systems described herein intercepting each read attempt, as mentioned earlier, in some examples a snapshot may intercept I/O from the virtual machine. In these examples, the active-passive replication may operate synchronously. Furthermore, the snapshot may reference the secondary storage device for all unchanged data and store changed data. Accordingly, the snapshot may fulfill one or more read attempts from the secondary storage device by reference and may fulfill one or more read attempts from changes saved within the snapshot. Using FIG. 6 as an example, virtual machine 430 may make a read attempt 696 and snapshot 680 may fulfill read attempt 696. If read attempt 696 is directed to data unchanged within the snapshot, then read attempt 696 may draw from secondary storage device 490 by reference. Otherwise, if read attempt 696 is directed to data changed by write attempt 694, read attempt 696 may draw from the change caused by write attempt 694 as recorded by snapshot 680.

By temporarily buffering write attempts made by a migrated virtual machine until the failover is complete and fulfilling read attempts from the primary storage device or the buffer in the case of asynchronous replication and from the secondary storage device or the buffer in the case of synchronous replication, these systems and methods may allow the live migration of the virtual machine, as well as a complete migration of the storage used by the virtual machine, using an active-passive replication system. Accordingly, these systems and methods may enable system administrators to perform live migration of virtual machines over long distances (e.g., from one data center to another) without requiring bidirectional synchronous replication (e.g., using an active-active replication system). Furthermore, these systems and methods may enable system administrators to migrate all components of a virtual machine, including storage, out of a data center that may be unusable in the near future (e.g., due to a scheduled outage of the data center, an anticipated disaster at the data center, etc.) without causing downtime for the virtual machine.

Figure 7:
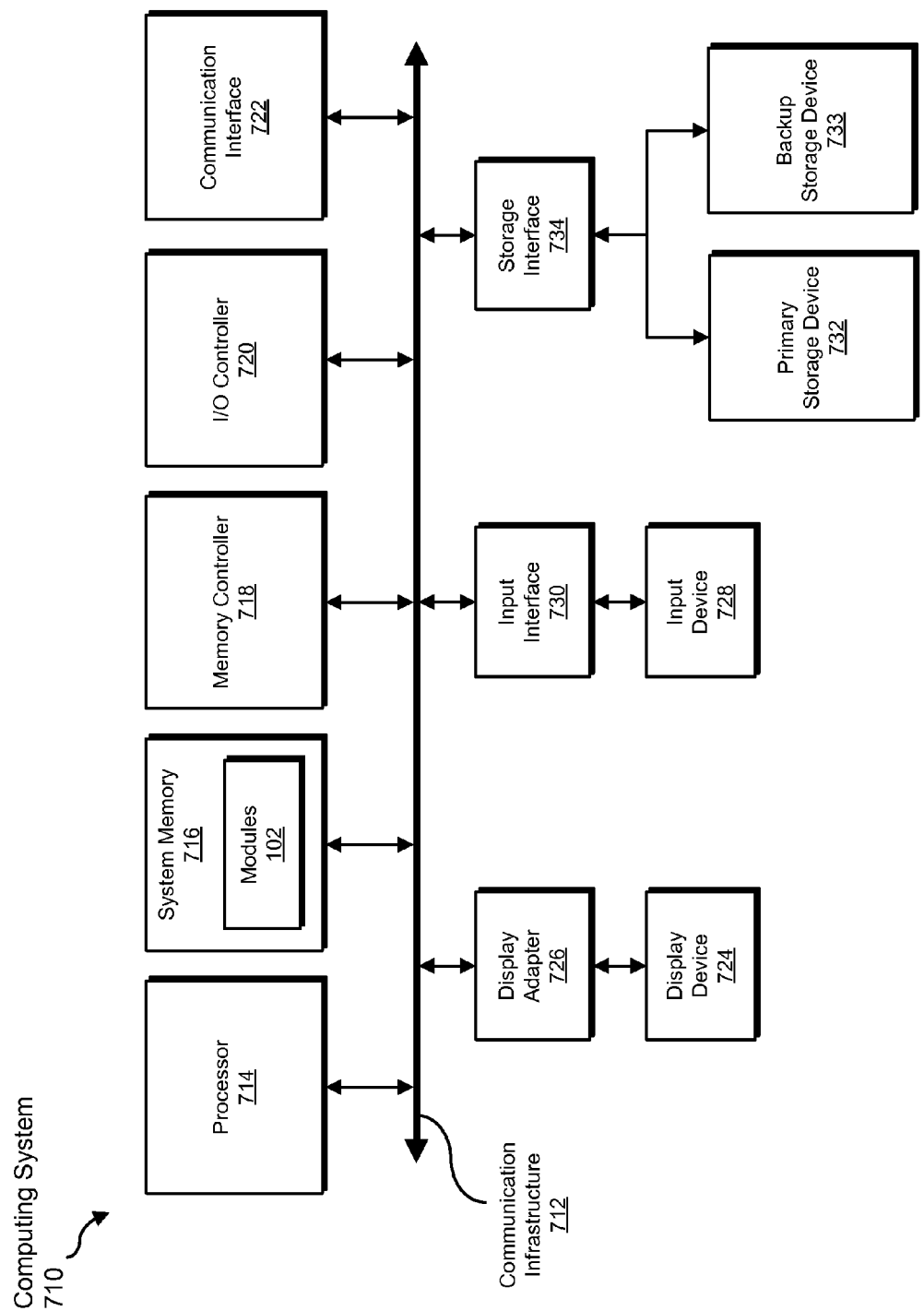
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, copying, initiating, bringing, terminating, interposing, creating, exposing, buffering, applying, determining, resynchronizing, intercepting, and/or fulfilling steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an input/output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, copying, initiating, bringing, terminating, interposing, creating, exposing, buffering, applying, determining, resynchronizing, intercepting, and/or fulfilling.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, copying, initiating, bringing, terminating, interposing, creating, exposing, buffering, applying, determining, resynchronizing, intercepting, and/or fulfilling steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, copying, initiating, bringing, terminating, interposing, creating, exposing, buffering, applying, determining, resynchronizing, intercepting, and/or fulfilling steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, copying, initiating, bringing, terminating, interposing, creating, exposing, buffering, applying, determining, resynchronizing, intercepting, and/or fulfilling steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, copying, initiating, bringing, terminating, interposing, creating, exposing, buffering, applying, determining, resynchronizing, intercepting, and/or fulfilling steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
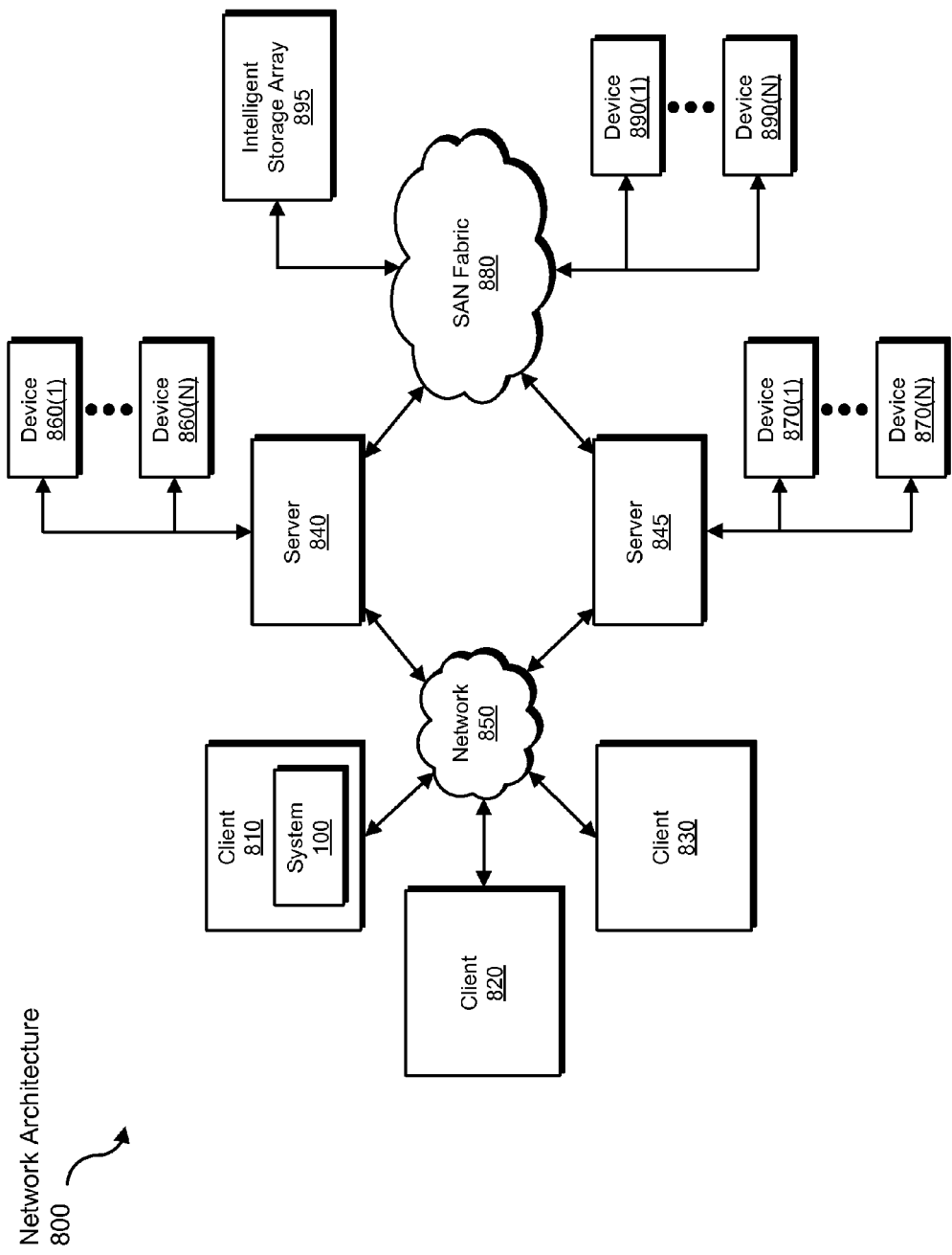
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, copying, initiating, bringing, terminating, interposing, creating, exposing, buffering, applying, determining, resynchronizing, intercepting, and/or fulfilling steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for facilitating long-distance live migrations of virtual machines.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing device into a device for performing long-distance live migration of virtual machines.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for facilitating long-distance live migrations of virtual machines, at least a portion of the method being performed by a computing device comprising at least one processor, the method comprising:
   identifying a request for a live migration of a virtual machine from a primary site to a secondary site, wherein:
      the primary site comprises a primary storage device used for storage by the virtual machine;
      the primary storage device is configured for active-passive replication to a secondary storage device at the secondary site;
   identifying the request for the live migration comprises determining that the physical distance between the primary site and the secondary site exceeds a predetermined threshold;
   in response to identifying the request for the live migration, initiating a failover of the active-passive replication from the primary storage device to the secondary storage device in response to the request;
   intercepting each write attempt made by the virtual machine at the secondary site to the secondary storage device before completion of the failover by interposing a virtual read-write layer between the virtual machine and the secondary site;
   buffering each intercepted write attempt;
   determining that the failover is complete;
   applying each buffered write attempt to the secondary storage device after determining that the failover is complete.

2. The computer-implemented method of claim 1, wherein the live migration comprises copying an execution state and a memory state of the virtual machine from the primary site to the secondary site.

3. The computer-implemented method of claim 1, wherein the failover comprises:
   bringing the secondary storage device into the same state as the primary storage device through the active-passive replication;
   terminating the active-passive replication.

4. The computer-implemented method of claim 1, wherein interposing the virtual read-write layer between the virtual machine and the secondary site comprises injecting a filter driver on top of a file system used by the virtual machine for the secondary storage device.

5. The computer-implemented method of claim 1, further comprising intercepting each read attempt made by the virtual machine at the secondary site to the secondary storage device before completion of the failover.

6. The computer-implemented method of claim 5, further comprising fulfilling at least one intercepted read attempt from the primary storage device.

7. The computer-implemented method of claim 5, further comprising:
   identifying at least one intercepted read attempt corresponding to a target location of at least one buffered write attempt;
   fulfilling the read attempt with the buffered write attempt.

8. The computer-implemented method of claim 1, wherein the active-passive replication comprises an asynchronous replication.

9. The computer-implemented method of claim 1, wherein the active-passive replication comprises a synchronous replication.

10. The computer-implemented method of claim 1, further comprising fulfilling at least one read attempt performed by the virtual machine from the secondary storage device.

11. The computer-implemented method of claim 1, wherein intercepting each write attempt comprises:
    creating a snapshot of the secondary storage device;
    exposing the virtual machine to the snapshot by mounting the snapshot.

12. The computer-implemented method of claim 11, wherein buffering each intercepted write attempt comprises applying each intercepted write attempt to the snapshot.

13. The computer-implemented method of claim 11, wherein applying each buffered write attempt comprises resynchronizing the snapshot with the secondary storage device.

14. A system for performing long-distance live migrations of virtual machines, the system comprising:
- an identification module programmed to identify a request for a live migration of a virtual machine from a primary site to a secondary site, wherein:
  - the primary site comprises a primary storage device used for storage by the virtual machine;
  - the primary storage device is configured for active-passive replication to a secondary storage device at the secondary site;
  - identifying the request for the live migration comprises determining that the physical distance between the primary site and the secondary site exceeds a predetermined threshold;
- a failover module programmed to, in response to identifying the request for the live migration, initiate a failover of the active-passive replication from the primary storage device to the secondary storage device in response to the request;
- an interception module programmed to:
  - intercept each write attempt made by the virtual machine at the secondary site to the secondary storage device before completion of the failover;
  - buffer each intercepted write attempt;
- a determination module programmed to determine that the failover is complete;
- an application module programmed to apply each buffered write attempt to the secondary storage device after determining that the failover is complete;
- at least one processor configured to execute the identification module, the failover module, the interception module, the determination module, and the application module.

15. The system of claim 14, wherein the live migration comprises copying an execution state and a memory state of the virtual machine from the primary site to the secondary site.

16. The system of claim 14, wherein the failover comprises:
- bringing the secondary storage device into the same state as the primary storage device through the active-passive replication;
- terminating the active-passive replication.

17. The system of claim 14, wherein the interception module is programmed to interpose a virtual read-write layer between the virtual machine and the secondary site by injecting a filter driver on top of a file system used by the virtual machine for the secondary storage device.

18. The system of claim 14, wherein the interception module is further programmed to intercept each read attempt made by the virtual machine at the secondary site to the secondary storage device before completion of the failover.

19. The system of claim 18, wherein the interception module is further programmed to fulfill at least one intercepted read attempt from the primary storage device.

20. A computer-readable-storage medium comprising one or more computer-executable instructions that, when executed by at least one processor of a computing device, cause the computing device to:
- identify a request for a live migration of a virtual machine from a primary site to a secondary site, wherein:
  - the primary site comprises a primary storage device used for storage by the virtual machine;
  - the primary storage device is configured for active-passive replication to a secondary storage device at the secondary site;
  - identifying the request for the live migration comprises determining that the physical distance between the primary site and the secondary site exceeds a predetermined threshold;
- in response to identifying the request for the live migration, initiate a failover of the active-passive replication from the primary storage device to the secondary storage device in response to the request;
- intercept each write attempt made by the virtual machine at the secondary site to the secondary storage device before completion of the failover by interposing a virtual read-write layer between the virtual machine and the secondary site;
- buffer each intercepted write attempt;
- determine that the failover is complete;
- apply each buffered write attempt to the secondary storage device after determining that the failover is complete.

* * * * *